(12) United States Patent
Connell, II et al.

(10) Patent No.: US 8,229,158 B2
(45) Date of Patent: Jul. 24, 2012

(54) METHOD, SYSTEM, AND PROGRAM PRODUCT FOR DETERMINING A STATE OF A SHOPPING RECEPTACLE

(75) Inventors: Jonathan H. Connell, II, Cortlandt-Manor, NY (US); Bernadette R. Duponchel, Lincoln, RI (US); Myron D. Flickner, San Jose, CA (US); Norman Haas, Mount Kisco, NY (US); Sharathchandra U. Pankanti, Norwalk, CT (US); Unsang Park, East Lansing, MI (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 12/111,652

(22) Filed: Apr. 29, 2008

(65) Prior Publication Data

US 2009/0268939 A1 Oct. 29, 2009

(51) Int. Cl.
*G06K 9/00* (2006.01)
*G06K 9/60* (2006.01)

(52) U.S. Cl. ........................................ 382/100; 382/305
(58) Field of Classification Search ........... 382/100–320
See application file for complete search history.

(56) References Cited

U.S. PATENT DOCUMENTS

| | | | |
|---|---|---|---|
| 4,323,772 A | 4/1982 | Serge | |
| 5,331,455 A | 7/1994 | Chang | |
| 5,426,282 A | 6/1995 | Humble | |
| 5,467,403 A | 11/1995 | Fishbine et al. | |
| 5,477,379 A | 12/1995 | Chang | |
| 5,497,314 A | 3/1996 | Novak | |
| 5,513,264 A | 4/1996 | Wang et al. | |
| 5,546,475 A | 8/1996 | Bolle et al. | |
| 5,583,686 A | 12/1996 | Chen | |
| 5,609,223 A | 3/1997 | Iizaka et al. | |
| 5,631,976 A | 5/1997 | Bolle et al. | |
| 5,635,697 A | 6/1997 | Shellhammer et al. | |
| 5,649,070 A | 7/1997 | Connell et al. | |

(Continued)

FOREIGN PATENT DOCUMENTS

WO 0225506 A1 3/2002

OTHER PUBLICATIONS

Reesen, Rick, "Virtual World Technologies to Manage a Grid—A Look at Some Realities, Concepts and Maybe Even the Future", Virtual Universe Community, Apr. 2, 2008, pp. 1-19.

(Continued)

*Primary Examiner* — Manav Seth
(74) *Attorney, Agent, or Firm* — Hoffman Warnick LLC; Anna L. Linne

(57) ABSTRACT

The present invention provides an approach for determining a state of a shopping receptacle. Specifically, under the present approach, an image capture device (e.g., camera) is positioned at the checkout station and/or on the shopping receptacle. The device will capture at least one image of the shopping receptacle during the checkout process and/or when the customer or checkout clerk indicates that the transaction is ready for payment (e.g., all items have been scanned or rung through). Using such image(s), a model for an empty receptacle and a knowledgebase of non-shopping items that may remain in the shopping receptacle, it is determined whether the receptacle is empty. If not, an alarm or other notification will be activated and the events can be logged.

21 Claims, 3 Drawing Sheets

U.S. PATENT DOCUMENTS

| | | | |
|---|---|---|---|
| 5,659,167 A | 8/1997 | Wang et al. | |
| 5,763,864 A | 6/1998 | O'Hagan et al. | |
| 5,811,774 A | 9/1998 | Ju et al. | |
| 5,815,200 A | 9/1998 | Ju et al. | |
| 5,883,968 A * | 3/1999 | Welch et al. | 382/100 |
| 5,918,211 A | 6/1999 | Sloane | |
| 6,005,959 A | 12/1999 | Mohan et al. | |
| 6,032,128 A | 2/2000 | Morrison et al. | |
| 6,064,469 A | 5/2000 | Brownstein | |
| 6,122,409 A | 9/2000 | Boggs et al. | |
| 6,287,299 B1 | 9/2001 | Sasnett et al. | |
| 6,310,964 B1 | 10/2001 | Mohan et al. | |
| 6,366,696 B1 | 4/2002 | Hertz et al. | |
| 6,382,357 B1 | 5/2002 | Morrison et al. | |
| 6,434,530 B1 | 8/2002 | Sloane et al. | |
| 6,457,644 B1 | 10/2002 | Collins, Jr. et al. | |
| 6,504,481 B2 | 1/2003 | Teller | |
| 6,556,276 B2 | 4/2003 | Staeheli et al. | |
| 6,606,171 B1 | 8/2003 | Renk et al. | |
| 6,726,094 B1 | 4/2004 | Rantze et al. | |
| 6,853,400 B1 | 2/2005 | Matama | |
| 6,991,158 B2 | 1/2006 | Munte | |
| 7,044,370 B2 | 5/2006 | Bellis et al. | |
| 7,118,026 B2 | 10/2006 | Harris et al. | |
| 7,124,058 B2 | 10/2006 | Namaky et al. | |
| 7,159,770 B2 | 1/2007 | Onozu | |
| 7,168,618 B2 | 1/2007 | Schwartz | |
| 7,196,624 B2 | 3/2007 | Teller | |
| 7,202,780 B2 | 4/2007 | Teller | |
| 7,219,838 B2 * | 5/2007 | Brewster et al. | 235/383 |
| 7,334,729 B2 | 2/2008 | Brewington | |
| 7,337,960 B2 | 3/2008 | Ostrowski et al. | |
| 7,337,962 B2 * | 3/2008 | Do et al. | 235/383 |
| 7,398,923 B2 * | 7/2008 | Do et al. | 235/383 |
| 7,422,147 B2 | 9/2008 | Rosenbaum | |
| 2001/0045463 A1 | 11/2001 | Madding et al. | |
| 2002/0004404 A1 | 1/2002 | Squibbs | |
| 2002/0013837 A1 | 1/2002 | Battat et al. | |
| 2002/0070861 A1 | 6/2002 | Teller | |
| 2002/0110374 A1 | 8/2002 | Staeheli et al. | |
| 2002/0121547 A1 | 9/2002 | Wieth et al. | |
| 2002/0161658 A1 | 10/2002 | Sussman | |
| 2002/0194074 A1 | 12/2002 | Jacobs | |
| 2003/0024982 A1 | 2/2003 | Bellis et al. | |
| 2003/0071725 A1 | 4/2003 | Teller | |
| 2003/0167242 A1 | 9/2003 | Hamilton | |
| 2004/0125396 A1 | 7/2004 | Burke | |
| 2005/0096855 A1 | 5/2005 | Teller | |
| 2005/0173527 A1 | 8/2005 | Conzola | |
| 2005/0189411 A1 | 9/2005 | Ostrowski et al. | |
| 2005/0189412 A1 | 9/2005 | Hudnut et al. | |
| 2005/0200490 A1 | 9/2005 | Teller | |
| 2005/0211771 A1 | 9/2005 | Onozu | |
| 2005/0237213 A1 | 10/2005 | Teller | |
| 2006/0010033 A1 | 1/2006 | Thomas | |
| 2006/0032915 A1 | 2/2006 | Schwartz | |
| 2006/0047835 A1 | 3/2006 | Greaux | |
| 2006/0161390 A1 | 7/2006 | Namaky et al. | |
| 2006/0179164 A1 | 8/2006 | Katibian et al. | |
| 2006/0288133 A1 | 12/2006 | Katibian et al. | |
| 2006/0289637 A1 | 12/2006 | Brice et al. | |
| 2006/0290980 A1 | 12/2006 | Terada | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0158417 A1 | 7/2007 | Brewington | |
| 2007/0279244 A1 | 12/2007 | Haughawout et al. | |
| 2008/0027796 A1 | 1/2008 | Chaves | |
| 2008/0059281 A1 | 3/2008 | Tower et al. | |
| 2008/0141755 A1 | 6/2008 | Edwards | |
| 2008/0142598 A1 | 6/2008 | Kwan | |
| 2008/0149725 A1 | 6/2008 | Rosenbaum | |
| 2008/0226129 A1 * | 9/2008 | Kundu et al. | 382/103 |
| 2009/0119168 A1 | 5/2009 | Otto et al. | |
| 2009/0268941 A1 * | 10/2009 | French et al. | 382/103 |

OTHER PUBLICATIONS

Sahai, Akhil, "Towards Distributed and Dynamic Network Management", Network Operations and Management Symposium, vol. 2, Feb. 15, 1998, pp. 455-464.

Vo, U.S. Appl. No. 12/037,266, Office Action Communication, Jan. 27, 2011, 31 pages.

Basit, U.S. Appl. No. 12/037,270, Office Action Communication, Jan. 21, 2011, 13 pages.

Johnson, U.S. Appl. No. 12/052,051, Office Action Communication, Dec. 23, 2010, 31 pages.

Connell II, et al., U.S. Appl. No. 11/782,177, Final Office Action, Apr. 23, 2010, 18 pages.

Connell II, et al., U.S. Appl. No. 12/052,046, Office Action, Apr. 2, 2010, 13 pages.

Connell II, et al., U.S. Appl. No. 11/782,173, Examiner's Answer, Apr. 30, 2010, 11 pages.

Connell II, et al., U.S. Appl. No. 11/756,391, Final Office Action, May 6, 2010, 18 pages.

Basit, U.S. Appl. No. 12/037,270, Office Action Communication, Jun. 15, 2011, 22 pages.

Mehta, "Delta Adds Fee to Tickets Not Bought Online; Airlines: The $2 charge applies to all round-trip domestic flights not booked through its Web site. Travel agens criticize the move." Los Angeles Times, Jan. 14, 1999, ProQuest LLC, 3 pages.

Johnson, U.S. Appl. No. 12/052,051, Notice of Allowance & Fees Due, Jul. 14, 2011, 20 pages.

Kim, U.S. Appl. No. 11/756,382, Office Action Communication, Sep. 29, 2010, 26 pages.

Stanford, U.S. Appl. No. 12/112,318, Office Action Communication, Nov. 8, 2010, 20 pages.

Crosland, U.S. Appl. No. 12/052,046, Notice of Allowance & Fees Due, Oct. 7, 2010, 14 pages.

Connell II, "Item Scanning System", U.S. Appl. No. 11/782,173, filed Jul. 24, 2007.

Connell II, Office Action Communication, U.S. Appl. No. 11/782,173, May 27, 2009, 12 pages.

Connell II, Office Action Communication, U.S. Appl. No. 11/782,173, Nov. 27, 2009, 12 pages.

Connell II, Office Action Communication, U.S. Appl. No. 11/782,177, Nov. 24, 2009, 16 pages.

Connell II, Office Action Communication, U.S. Appl. No. 12/052,051, Jun. 26, 2009, 19 pages.

Connell II, Office Action Communication, U.S. Appl. No. 12/052,051, Sep. 8, 2009, 19 pages.

Connell II, Office Action Communication, U.S. Appl. No. 11/756,391, Dec. 2, 2008, 19 pages.

Connell II, Office Action Communication, U.S. Appl. No. 12/052,051, Feb. 23, 2008, 23 pages.

Derwent, "Web Based Ordering System for Non-Standarised Goods e.g. fruit, vegetables provides view of item for selection and prints bar code on item for order processing", 2 pages.

Connell II, U.S. Appl. No. 12/052,051, Office Action Communication, Jan. 6, 2010, 24 pages.

Bolle et al., "VeggieVision: A Produce Recognition System", pp. 1-4, IEEE Workshop on Applications of Computer Vision, WACV 1996.

Bolle et al., "VeggieVision: A Produce Recognition System", pp. 1-8, 1996.

Connell II, U.S. Appl. No. 12/052,051, Office Action Communication, Jun. 11, 2010, 32 pages.

Vo, U.S. Appl. No. 12/037,266, Office Action Communication, Jul. 22, 2011, 18 pages.

Kim, U.S. Appl. No. 11/756,382, Notice of Allowance & Fees Due, Mar. 24, 2011, 11 pages.

Stanford, U.S. Appl. No. 12/112,318, Office Action Communication, May 3, 2011, 16 pages.

Hai, U.S. Appl. No. 12/037,270, Office Action Communication, Aug. 6, 2010, 19 pages.

Vo, U.S. Appl. No. 12/037,266, Office Action Communication, Nov. 17, 2011, 12 pages.

Basit, U.S. Appl. No. 12/037,270, Office Action Communication, Nov. 17, 2011, 21 pages.

Stanford, U.S. Appl. No. 11/782,177, Office Action Communication, Feb. 28, 2012, 31 pages.

Vo, U.S. Appl. No. 12/037,266, Office Action Communication, Mar. 9, 2012, 13 pages.

Stanford, U.S. Appl. No. 11/756,391, Office Action Communication, Mar. 12, 2012, 29 pages.

* cited by examiner

METHOD, SYSTEM, AND PROGRAM PRODUCT FOR DETERMINING A STATE OF A SHOPPING RECEPTACLE

CROSS-REFERENCE TO RELATED APPLICATIONS

This application is related in some aspects to the commonly owned application entitled "Smart Scanning System," filed May 31, 2007, and which is assigned U.S. patent application Ser. No. 11/756,391, the entire contents of which are herein incorporated by reference. This application is also related in some aspects to the commonly owned application entitled "Secure Self Checkout," filed Feb. 26, 2008, and which is assigned U.S. patent application Ser. No. 12/037,266, the entire contents of which are herein incorporated by reference.

FIELD OF THE INVENTION

The present invention generally relates to shopping checkout (e.g., retail). Specifically, the present invention provides a way to determine a state of a shopping receptacle at checkout for increased loss prevention.

BACKGROUND OF THE INVENTION

Shopping checkout (e.g., retail supermarket, etc.) is a process that is familiar to most everyone. Typical checkout involves a shopper navigating about a store collecting items for purchase. Often the shopper will utilize a shopping receptacle such as a shopping cart and/or shopping basket. Upon completion of gathering the desired items, the shopper will proceed to a checkout station for checkout (e.g., bagging and payment). In recent years, many stores have become equipped with self-checkout stations whereby a shopper will scan and bag the items his/herself, and then make payment via the self-checkout station.

Loss prevention in stores has become an increasing concern over the years. Many stores have cameras and/or personnel at strategic positions to reduce loss due to theft or accident. Unfortunately, fraud at the point of checkout remains a looming threat.

SUMMARY OF THE INVENTION

In general, the present invention provides an approach for determining a state of a shopping receptacle. Specifically, under the present approach, an image capture device (e.g., camera) is positioned at the checkout station and/or on the shopping receptacle. The device will capture at least one image of the shopping receptacle during the checkout process and/or when the customer or checkout clerk indicates that the transaction is ready for payment (e.g., all items have been scanned or rung through). Using such image(s), a model for an empty receptacle and a knowledgebase of non-shopping items that may remain in the shopping receptacle, it is determined whether the receptacle is empty. If not, an alarm or other notification will be activated and the events can be logged.

A first aspect of the present invention provides a computer-implemented method for determining a state of a shopping receptacle, comprising: referencing a model of a shopping receptacle when empty; referencing a knowledgebase of non-shopping items typically placed in shopping receptacles; detecting an end of a shopping transaction; and determining if the shopping receptacle is empty by using at least one image taken of the shopping receptacle at the end of the shopping transaction and the model, and by considering any non-shopping items present in the shopping receptacle.

A second aspect of the present invention provides a system for determining a state of a shopping receptacle, comprising: a module for referencing a model of a shopping receptacle when empty; a module for referencing a knowledgebase of non-shopping items typically placed in shopping receptacles; a module for detecting an end of a shopping transaction; and a module for determining if the shopping receptacle is empty by using at least one image taken of the shopping receptacle at the end of the shopping transaction and the model, and by considering any non-shopping items present in the shopping receptacle.

A third aspect of the present invention provides a program product stored on a computer readable medium for determining a state of a shopping receptacle, the computer readable medium comprising instructions for causing a computer system to: reference a model of a shopping receptacle when empty; reference a knowledgebase of non-shopping items typically placed in shopping receptacles; detect an end of a shopping transaction; and determine if the shopping receptacle is empty by using at least one image taken of the shopping receptacle at the end of the shopping transaction and the model, and by considering any non-shopping items present in the shopping receptacle.

A fourth aspect of the present invention provides a method for deploying an application for determining a state of a shopping receptacle, comprising: deploying a computer infrastructure being operable to: reference a model of a shopping receptacle when empty; reference a knowledgebase of non-shopping items typically placed in shopping receptacles; detect an end of a shopping transaction; and determine if the shopping receptacle is empty by using at least one image taken of the shopping receptacle at the end of the shopping transaction and the model, and by considering any non-shopping items present in the shopping receptacle.

A fifth aspect of the present invention provides a data processing system for determining a state of a shopping receptacle, comprising: a memory medium having instructions; a bus coupled to the memory medium; and a processor coupled to the bus that when executing the instructions causes the data processing system to: reference a model of a shopping receptacle when empty, reference a knowledgebase of non-shopping items typically placed in shopping receptacles, detect an end of a shopping transaction, and determine if the shopping receptacle is empty by using at least one image taken of the shopping receptacle at the end of the shopping transaction and the model, and by considering any non-shopping items present in the shopping receptacle.

BRIEF DESCRIPTION OF THE DRAWINGS

These and other features of this invention will be more readily understood from the following detailed description of the various aspects of the invention taken in conjunction with the accompanying drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As used herein, the following terms have the associated meanings:

"Set"—a quantity of at least one.

"Shopping Receptacle"—any container capable of holding items such as a shopping cart, a shopping basket, a shopping bag, etc.

"Image Capture Device"—means any type of camera or the like, such as a still image camera, a video camera, etc.

As indicated above, the present invention provides an approach for determining a state of a shopping receptacle. Specifically, under the present approach, an image capture device (e.g., camera) is positioned at the checkout station and/or on the shopping receptacle. The device will capture at least one image of the shopping receptacle during the checkout process and/or when the customer or checkout clerk indicates that the transaction is ready for payment (e.g., all items have been scanned or rung through). Using such image(s), a model for an empty receptacle and a knowledgebase of non-shopping items that may remain in the shopping receptacle, it is determined whether the receptacle is empty. If not, an alarm or other notification will be activated and the events can be logged.

Figure 1:
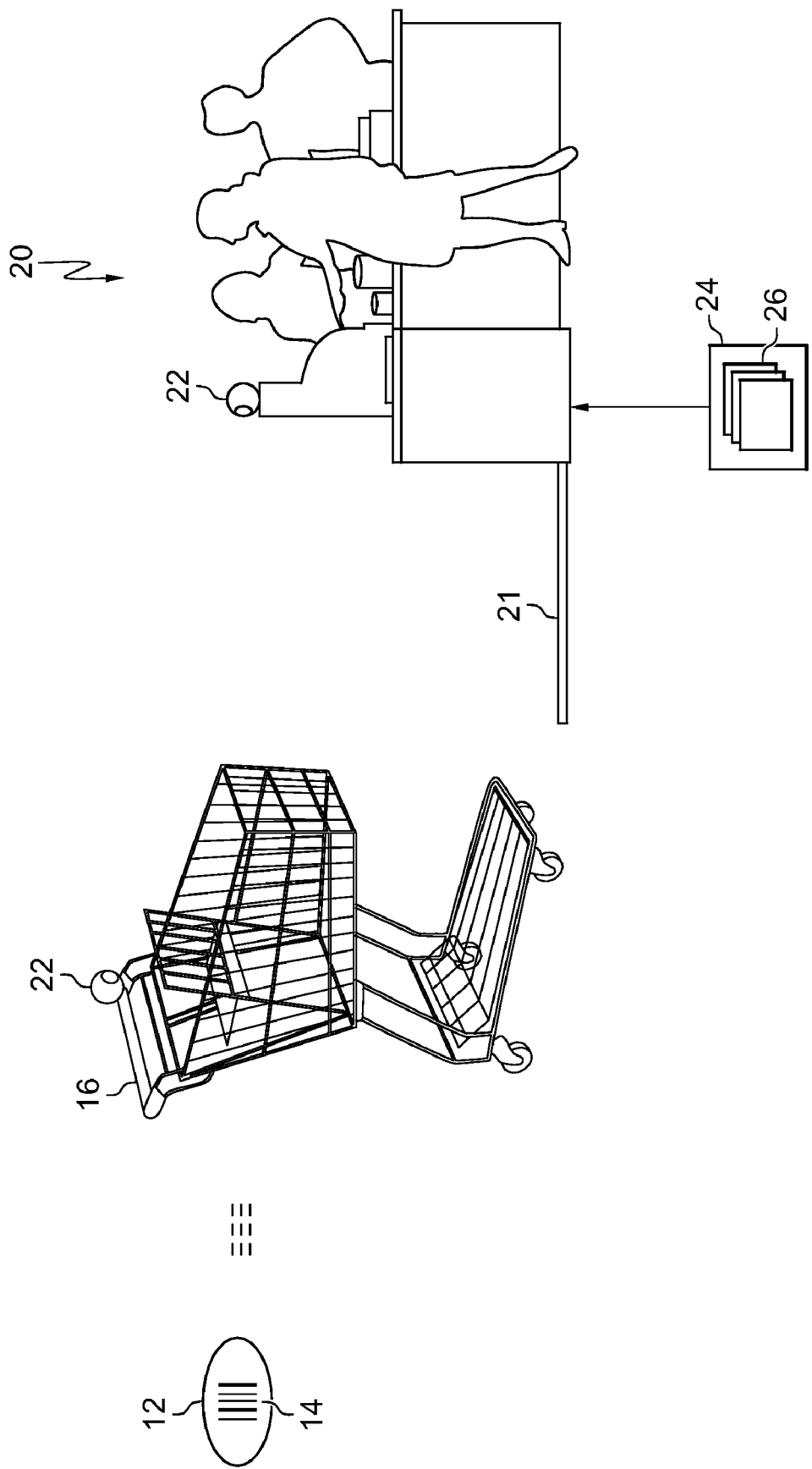
FIG. 1 depicts system for determining a state of a shopping receptacle according to one embodiment of the present invention.

Referring now to FIG. 1, a system for determining a state of a cart according to one embodiment of the present invention is shown. In this embodiment, the shopping receptacle comprises a cart 16. Specifically, when a shopper approaches a checkout station, he/she will begin the checkout process as typically performed by passing (or having passed) items such as item 12 by a barcode reader, which reads barcode 14 to determine an identity and corresponding price of item 12. With the growing pervasiveness of self-checkout stations, there are few checks and balances to ensure that all items in cart 16 have been scanned. Even where a self-checkout station is not used, checkout clerk mistakes or collusion can result in one or more items from being omitted from the checkout process, thereby causing loss to the store.

Therefore, under the present approach, an image capture device 22 mounted on cart 16 and/or at checkout station 20 is used to capture at least one image of cart 16 during, at, and/or at the conclusion of the transaction. It should be understood that image capture device 22 can be integrated with a barcode reader as described in the above-incorporated patent applications. In any event, the at least one image will be accessed by the modules 26 of a receptacle state program 24. Thereafter, modules 26 will reference a model of cart 16 when empty. This model generally comprises a likeness or other images of cart when empty based on historical data. Then, any non-shopping items (e.g., purse, child, etc.) remaining in cart 16 will be identified by referencing a knowledgebase of non-shopping items typically placed in carts. Once the end of the shopping transaction (e.g., checkout process) is detected, it will be determined if the cart is empty for checkout purposes. This is based on the at least one image, the model of the empty cart, and the consideration of any non-shopping items identified as being in the cart. In general, the model and the non-shopping items are automatically learned based on a history of shopping transactions.

Once the results are determined any desired alerts/notifications can be sent, and the transaction and/or result can be logged. The alerts/notifications can comprise alarms, (e.g., positive indicating no store-based items were left out of the checkout process, negative indicating one or more were left out of the checkout process, etc.), electronic messages, etc. In any event, the concepts of this invention be are used in conjunction with a scale 21 at checkout station 20. Modules 26 can be configured to determine/access a weight of cart 16 when empty. This can be part of the model discussed above. Regardless, non-shopping items can be identified as discussed above, their corresponding weights accessed as well. The weight of any non-shopping items is subtracted from the weight of the total cart, which should leave only the weight of an empty cart. Any residual weight could be that of shopping items not checked-out and alarms/notifications/logging could be performed.

Figure 2:
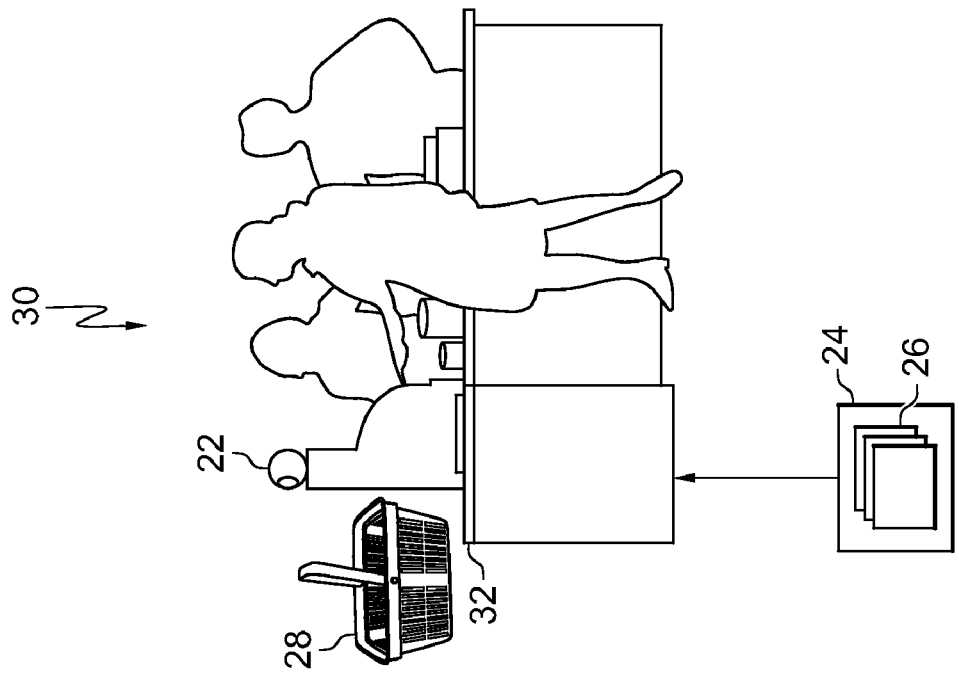
FIG. 2 depicts determining a state of a shopping receptacle to another embodiment of the present invention.
Figure 2:
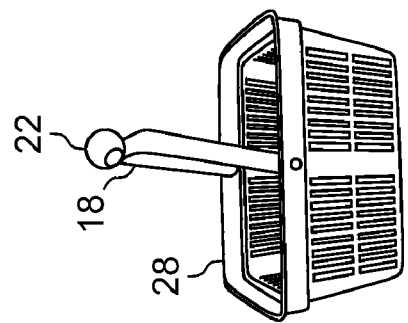
Figure 2:
Figure 2:
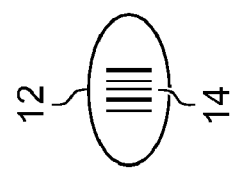

Referring to FIG. 2, another embodiment of the present invention is shown. In this case, the shopping receptacle comprises a basket 28. Other than this one distinction, the functions/features of the invention are similar to those detailed above in conjunction with FIG. 1. Specifically, under the present invention, basket 28 and/or checkout station 30 can be fitted with an image capture device 22. As mentioned above, when a shopper approaches checkout station 30, he/she will begin the checkout process as typically performed by passing (or having passed) items such as item 12 by a barcode reader, which reads barcode 14 to determine an identity and corresponding price of item 12.

Similar to that stated above in conjunction with FIG. 1, under the present approach image capture device 22 mounted on basket 28 and/or at checkout station 30 captures at least one image of basket 28 during, at, and/or after the conclusion of the shopping transaction. It should be understood that image capture device 22 can be integrated with a barcode reader as described in the above-incorporated patent applications. In any event, the at least one image will be accessed by the modules 26 of the receptacle state program 24. Thereafter, modules 26 will reference a model of basket 28 when empty. This model generally comprises a likeness or other images of cart when empty based on historical data. Then, any non-shopping items (e.g., purse, child, etc.) remaining in basket 28 can be identified by referencing a knowledgebase of non-shopping items typically placed in carts. Once the end of the shopping transaction (e.g., checkout process) is detected, it will be determined if the cart is empty for checkout purposes. This is based on the at least one image, the model of the empty cart, and the consideration of any non-shopping items identified as being in the cart. In general, the model and the non-shopping items are automatically learned based on a history of shopping transactions.

Once the results are determined any desired alerts/notifications can be sent, and the transaction and/or result can be logged. The alerts/notifications can comprise alarms (e.g., positive indicating no store-based items were left out of the checkout process, negative indicating one or more were left out of the checkout process, etc.), electronic messages, etc. In any event, the concepts of this invention could be used in conjunction with a scale 32 at checkout station 30. Modules 26 can be configured to determine/access a weight of basket 28 when empty. This can be part of the model discussed above. Regardless, non-shopping items will be identified as discussed above, their corresponding weights accessed as well. The weight of any non-shopping items will be subtracted from the weight of the total cart, which should leave only the weight of an empty cart. Any residual weight could be that of shopping items not checked-out and alarms/notifications/logging could be performed.

II. Computerized Implementation

Figure 3:
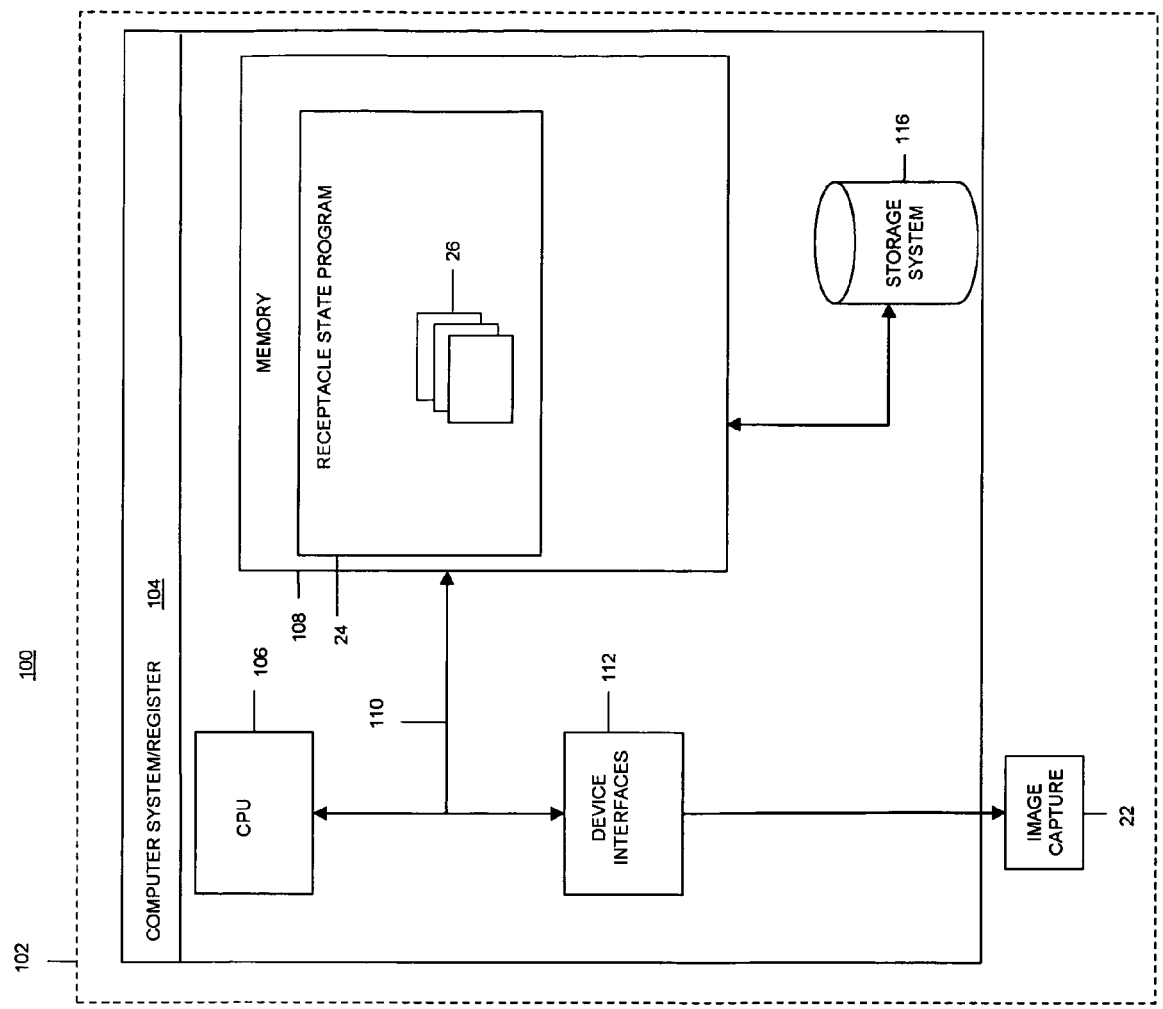
FIG. 3 depicts a more specific computerized implementation according to the present invention.

Referring now to FIG. 3, a computerized implementation 100 of the present invention is shown. As depicted, implementation 100 includes computer system/register 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system/register 104 is typically that which would be present at checkout stations 20 and 30. As shown, computer system/register 104 includes a processing unit 106, a memory 108, a bus 110, and device interfaces 112. Further, computer system/register 104 is shown having image capture device 22 and storage system 116 that communicate with bus via device interfaces (although image capture device 22 alternatively could directly communicate with bus 110). In general, processing unit 106 executes computer program code, such as checkout software/program 24, which is stored in memory 108 and/or storage system 116. While executing computer program code, processing unit 106 can read and/or write data to/from memory 108, storage system 116, and/or device interfaces 112. Bus 110 provides a communication link between each of the components in computer system/register 104. Although not shown, computer system/register 104 could also include I/O interfaces that communicate with: one or more external devices such as a kiosk, a checkout station, a keyboard, a pointing device, a display, etc.); one or more devices that enable a user to interact with computer system/register 104; and/or any devices (e.g., network card, modem, etc.) that enable computer system/register 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system/register 104 is only representative of various possible computer systems that can include numerous combinations of hardware. To this extent, in other embodiments, computer system/register 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 3 can be included in computer system/register 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system/register 104.

Shown in memory 108 of computer system/register 104 is receptacle state program 24, with a set of modules 26. The modules 26 generally provide the functions of the present invention as described and claimed herein. Specifically (among other things), set of modules 26 is configured to: reference a model of a shopping receptacle when empty; reference a knowledgebase of non-shopping items typically placed in shopping receptacles; detect an end of a shopping transaction; determine if the shopping receptacle is empty by using at least one image taken of the shopping receptacle at the end of the shopping transaction and the model, and by considering any non-shopping items present in the shopping receptacle; automatically learn the model of the shopping receptacle when empty based on a history of shopping transactions; automatically learn the non-shopping items typically placed in the shopping receptacle based on the history; and capture the at least one image of the shopping receptacle using an image capture device.

While shown and described herein as shopping receptacle state determination, it is understood that the invention further provides various alternative embodiments. For example, in one embodiment, the invention provides a computer-readable/useable medium that includes computer program code to enable a computer infrastructure to provide shopping receptacle state determination. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide secure self-checkout and/or configuration of portable devices for shopping checkout. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for shopping receptacle state determination. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system/register 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for determining a state of a shopping receptacle, comprising:
   referencing a model of a shopping receptacle when empty;
   referencing a knowledgebase of non-shopping items typically placed in shopping receptacles;
   detecting an end of a shopping transaction;
   determining whether any non-shopping item is present in the shopping receptacle using at least one image taken of the shopping receptacle and the knowledgebase of non-shopping items; and
   determining if the shopping receptacle is empty by using at least one image taken of the shopping receptacle at the end of the shopping transaction and the model, and by considering any non-shopping items present in the shopping receptacle.

2. The method of claim 1, further comprising: automatically learning the model of the shopping receptacle when empty based on a history of shopping transactions.

3. The method of claim 2, further comprising automatically learning the non-shopping items typically placed in the shopping receptacle based on the history.

4. The method of claim 1, wherein the shopping receptacle comprises a basket.

5. The method of claim 1, wherein the shopping receptacle comprises a cart.

6. The method of claim 1, further comprising capturing the at least one image of the shopping receptacle using an image capture device.

7. The method of claim 6, wherein the image capture device is positioned at a checkout station.

8. The method for claim 6, wherein the image capture device is integrated with the shopping receptacle.

9. A system for determining a state of a shopping receptacle, comprising:
   a module for referencing a model of a shopping receptacle when empty;
   a module for referencing a knowledgebase of non-shopping items typically placed in shopping receptacles;
   a module for detecting an end of a shopping transaction;
   a module for determining whether any non-shopping item is present in the shopping receptacle using at least one image taken of the shopping receptacle and the knowledgebase of non-shopping items; and
   a module for determining if the shopping receptacle is empty by using at least one image taken of the shopping receptacle at the end of the shopping transaction and the model, and by considering any non-shopping items present in the shopping receptacle.

10. The system of claim 9, further comprising a module for automatically learning the model of the shopping receptacle when empty based on a history of shopping transactions.

11. The system of claim 10, further comprising a module for automatically learning the non-shopping items typically placed in the shopping receptacle based on the history.

12. The system of claim 9, wherein the shopping receptacle comprises a basket.

13. The system of claim 9, wherein the shopping receptacle comprises a cart.

14. The system of claim 9, further comprising a module for capturing the at least one image of the shopping receptacle using an image capture device.

15. The system of claim 14, wherein the image capture device is position at a checkout station.

16. The system for claim 14, wherein the image capture device is integrated with the shopping receptacle.

17. A program product stored on a computer readable storage medium for determining a state of a shopping receptacle, the computer readable medium comprising instructions for causing a computer system to:
   reference a model of a shopping receptacle when empty;
   reference a knowledgebase of non-shopping items typically placed in shopping receptacles;

detect an end of a shopping transaction;
determine whether any non-shopping item is present in the shopping receptacle using at least one image taken of the shopping receptacle and the knowledgebase of non-shopping items; and
determine if the shopping receptacle is empty by using at least one image taken of the shopping receptacle at the end of the shopping transaction and the model, and by considering any non-shopping items present in the shopping receptacle.

18. The program product of claim 17, further comprising instructions for causing a computer system to: automatically learn the model of the shopping receptacle when empty based on a history of shopping transactions.

19. The program product of claim 18, further comprising instructions for causing a computer system to automatically learn the non-shopping items typically placed in the shopping receptacle based on the history.

20. The program product of claim 17, further comprising instructions for causing a computer system to capture the at least one image of the shopping receptacle using an image capture device.

21. A method for deploying an application for determining a state of a shopping receptacle, comprising:

deploying a computer infrastructure being operable to:
reference a model of a shopping receptacle when empty;
reference a knowledgebase of non-shopping items typically placed in shopping receptacles;
detect an end of a shopping transaction;
determine whether any non-shopping item is present in the shopping receptacle using at least one image taken of the shopping receptacle and the knowledgebase of non-shopping items; and
determine if the shopping receptacle is empty by using at least one image taken of the shopping receptacle at the end of the shopping transaction and the model, and by considering any non-shopping items present in the shopping receptacle.

\* \* \* \* \*